United States Patent [19]
Hirai et al.

[11] 3,936,399
[45] Feb. 3, 1976

[54] PROCESS OF PRODUCING PHENOLIC CHELATE RESIN USING IMINODIACETIC ACID

[75] Inventors: Masahide Hirai, Uji; Mikio Fujimura, Kamo; Masahiro Kazigase; Minoru Saito, both of Uji, all of Japan

[73] Assignee: Unitika Ltd., Amagasaki, Japan

[22] Filed: Jan. 21, 1974

[21] Appl. No.: 435,126

[30] Foreign Application Priority Data
Jan. 23, 1973   Japan.................................. 48-9793

[52] U.S. Cl............. 260/2.2 C; 260/29.3; 260/51.5; 210/38 B
[51] Int. Cl.².......................................... C08G 14/06
[58] Field of Search............. 260/2.2 C, 51.5, 59, 54

[56] References Cited
UNITED STATES PATENTS

| | | | |
|---|---|---|---|
| 2,763,680 | 9/1956 | Sallmann | 260/471 A |
| 3,313,779 | 4/1967 | White | 260/59 |

OTHER PUBLICATIONS
Chem. Abstracts, Vol. 48, 1954, 6326g, Ciba.
Chem. Abstracts, Vol. 64, 1966, 9291b–c, Hering.

Primary Examiner—Howard E. Schain
Attorney, Agent, or Firm—Sughrue, Rothwell, Mion, Zinn & Macpeak

[57] ABSTRACT

A phenolic chelate resin having a high heavy-metal chelating ability and capable of being reused is produced by polycondensing a phenol containing an iminodiacetic acid group with an aldehyde.

13 Claims, No Drawings

PROCESS OF PRODUCING PHENOLIC CHELATE RESIN USING IMINODIACETIC ACID

BACKGROUND OF THE INVENTION

1. Field of the Invention

The present invention relates to a process for producing a phenolic chelate resin having a selective adsorbability to a heavy metal using a phenol, an aldehyde, and iminodiacetic aicd. The invention is further relates to a simple process for producing a phenolic chelate resin having excellent heavy metal chelating ability and capable of being reused.

2. Description of the Prior Art

For a long time various investigations have been made on phenolic chelate resins prepared by introducing chelating group into a phenol nucleus. However, since the chelating group is chemically unstable, the cost of raw materials is high, and also the production cost becomes high. As a result very few chelate resins are commercially available and further the commercially available chelate resins are also restricted in their reuse due to the unstability of the chelating group.

Materials such as iminodiacetic acid which are capable of forming chelate compounds by coordination with heavy metal ions are well known and research on metal chelation has now been extended to various fields such as organic reagents for inorganic analytical chemistry, chelate titration, solvent extraction of metal ions, complex salt dyes, chelate pigments, and blocking agents for metal ions for use in the chemical industry. On the other hand, chelate resins prepared by introducing into high molecular weight compounds ligands which are capable of forming chelate compounds with heavy metal ions, that is, compounds having chelating groups so that they can coordinate with heavy metals due to chelation have been reported in various publications.

However, the kinds of commercially available chelate resins are very few since the chelating groups introduced into high molecular weight materials are generally poor in chemical stability as compared with ordinary ion-exchange groups such as a sunfonic group, a carboxyl group, and a quaternary ammonium group. This makes the reuse of such chelate resins difficult, the cost of the chelating group itself is high, and the procedure of introducing the chelating groups into high molecular weight materials is comparatively complicated, which results in greatly increasing the cost of the chelate resins as compared with ordinary ion-exchange resins.

SUMMARY OF THE INVENTION

As the results of various investigations on discovering a process for preparing easily a chelate resin having excellent selective adsorbability to heavy metals by introducing as side chains of synthetic high polymer compounds which have a chelating effect, which are chemically stable, and which are comparatively inexpensive, the inventors have succeeded in discovering the process of this invention.

That is, the inventors have succeeded in producing a novel phenolic chelate resin having high selective adsorbability to heavy metals and comprising a phenol, an aldehyde, and iminodiacetic acid.

An object of this invention is, therefore, to provide a process for producing a phenolic resin having excellent selective adsorbability to heavy metals and capable of being reused repreatedly.

Another object of this invention is to provide a process for producing easily and at a low cost the aforesaid chelate resin.

A further object of this invention is to provide the aforesaid novel phenolic chelate resin.

Thus, the present invention provides a process for producing a phenolic chelate resin for chelating heavy metals which comprises polycondensing a phenol and an aldehyde, an iminodiacetic acid group having been introduced into a part of the phenol nucleus in the polymer.

DETAILED DESCRIPTION OF THE INVENTION

Iminodiacetic acid used in the present invention can be prepared from inexpensive raw materials such as ammonia, hydrogen cyanide, formaldehyde, etc. The iminodiacetic acid contains the moiety $-N-CH_2-COOH$ as contained in a low molecular weight chelating agent industrially produced such as ethylene diaminetetraacetic acid or nitrilotriacetic acid and exhibits quite excellent chemical stability as compared with other chelating agents.

In the process of this invention, a phenol, an aldehyde, and iminodiacetic acid are reacted in an equimolar ratio or in such a ratio that the amounts of the phenol or aldehyde are in excess to the amount of the iminodiacetic acid, whereby the iminodiacetic acid is first introduced into the phenol nucleus by a Mannich reaction. Then, the entire amount of the phenol (including the phenol having the iminodiacetic acid introduced thereto) is subjected to a condensation reaction with the aldehyde in a molar ratio which meets the desired object to produce the chelate resin. In the above reaction, the molar ratio of the phenol, the aldehyde and the iminodiacetic acid employed can be selected in such a manner that the iminodiacetic acid is used in a molar ratio of 0.1 to 0.9, preferably 0.3 to 0.6 to the total phenol and that the molar ratio of the aldehyde to the total phenol is 0.5 to 2.0, preferably 0.7 to 1.5.

The reaction of introducing iminodiacetic acid into a low molecular weight aromatic ring having a phenolic hydroxyl group has long been known since Schwarzenbach prepared a metal indicator by introducing an iminodiacetic acid group as a chelate-forming group into a phthaleinic dye or a sulfophthaleinic dye.

However, in producing a high molecular material after introducing iminodiacetic acid, the yield in the introduction of iminodiacetic acid becomes low and further if the positions of the aromatic ring to which iminodiacetic acid is introduced and the number of iminodiacetic acid groups introduced into the aromatic ring are not sufficiently controlled, the subsequent polymerization and cross-linking can not be sufficiently conducted resulting in only a resin having a low metal adsorbability or resulting in a resin which does not have a durable strength in practical use.

A feature of this invention, on the other hand, lies in the discovery of a process of producing a phenolic chelate resin capable of being used repeatedly and having excellent metal adsorbability, which have never been attained in conventional phenolic chelate resins by controlling the introduction of iminodiacetic acid groups into an aromatic ring so that the subsequent polymerization reaction can proceed easily.

As phenol resins, a resole-type resin which is cured by heat-treatment only as disclosed in U.S. Pat. No. 3,650,102 and a novolak-type resin which requires an addition of an aldehyde as disclosed in U.S. Pat. No. 2,190,672, etc. are well known. In the process of this invention a resole-type phenolic chelate resin or a novolak-type phenolic chelate resin can be produced by controlling or changing the molar ratio of the aldehyde and the phenol (hereinafter, the ratio is called "A/P").

That is, in order to obtain a resole-type phenolic chelate resin which can be cured by heat treatment only, it is necessary that the A/P ratio be in the range of 1.1 to 1.5 and in order to produce a novolak-type phenolic chelate resin which requires a cross linking treatment other than by a heat treatment, it is necessary that the A/P ratio be in the range of 0.7 to 1.1. Therefore, the ratio A/P in the conditions of the production of phenol resins in general has the same significance as in the A/P ratio in the production of the phenolic chelate resins of this invention. However, in the case of producing the phenolic chelate resins of this invention from a phenol, an aldehyde, and iminodiacetic acid, it is as a matter of course necessary that the aldehyde which is used in an amount equimolar to the iminodiacetic acid in the above Mannich reaction be used in excess in the entire process of this invention.

For producing the phenolic chelate resin having selective absorbability to heavy metal ions from a phenol, an aldehyde, and iminodiacetic acid, a 5 to 90, preferably 20 to 70 wt% aqueous suspension of a mixture of the three components is heated to 20° to 90°C, preferably 40° to 60°C to uniformly suspend the iminodiacetic acid in the solution and thereafter the mixture is maintained at temperatures of 20° to 90°C, preferably 40° to 60°C for a period of 1 to 4, preferably 2 to 3 hours for the Mannich reaction to occur, whereby the iminodiacetic acid group is introduced into the phenol. This reaction is a first reaction step.

After the first step reaction is completed, the reaction system is subjected to a condensation reaction which is a second reaction step. In this case, the additional phenol or the aldehyde can be further added to the system in the condensation reaction step.

To obtain a chelate resin having a composition as homogeneous as is possible, it is desirable to conduct the second reaction step at such temperature conditions that the reaction temperature is first controlled at 50° to 90°C and then the temperature is increased gradually. The temperature is finally maintained at 90° to 110°C and the reaction proceeds under refluxing. The reaction time generally required for this second step of the reaction is 1 to 6, preferably 2 to 4 hours. The condensation reaction in the second reaction step may be carried out in the presence of a solvent, e.g., carbon tetrachloride, chloroform, trichloroethylene, chloral, dichloroethylene, dichloroethane, 1,2-dichloropropane, chlorobenzene, cyclohexane, cyclohexanol, toluene and the like in a volume of 0.01 to 5.0 times the volume of the reaction mixture.

In producing the resole-type or novolak-type phenolic chelate resin, it is desirable to add the phenol at the beginning of the reaction in the first step or the second step reaction. When the second step reaction proceeds until a desired condensation degree is obtained, the reaction product is dehydrated by heating it to about 90° to 110°C under a reduced pressure of from a normal pressure to about 400 mmHg to provide a viscous resinous composition. If necessary, the resinous composition can be washed with fresh water.

Examples of suitable phenols which can be used in this invention include phenol, alkyl-substituted phenols such as o-ethylphenol, m-ethylphenol, p-ethylphenol, p-phenylphenol, bis-phenol A, o-cresol, m-cresol, p-cresol, 2,3-xylenol, 2,5-xylenol, 3,4-xylenol, 3,5-xylenol, etc., polyhydric phenols such as resorcinol, catechol, etc., and compounds having a phenolic hydroxyl group such as $\alpha$-naphthol. The phenols can be used individually or as a mixture thereof.

Examples of suitable aldehydes which can be used in this invention include formaldehyde and formaldehyde derivatives such as formaldehyde, para-formaldehyde, hexamethylenetetramine, etc.; aliphatic aldehydes such as acetaldehyde, propionaldehyde, etc.; aromatic aldehydes such as benzaldehyde, etc.; and heterocyclic aldehydes such as furfural, etc. The aldehydes can also be used individually or as a mixture thereof.

In the case of conducting the aforesaid first step Mannich reaction, a protonic acid, e.g., a mineral acid such as hydrochloric acid, sulfuric acid, etc.; an organic acid such as formic acid, oxalic acid, etc.; and an aromatic sulfonic acid such as benzenesulfonic acid can be used as a reaction promotor in an amount 1.1 to 3.0 times that of the iminodiacetic acid. In the second condensation reaction, either the above protonic acid in the above amount or an alkali in an amount 2.1 to 4.0 times that of the iminodiacetic acid can be used. Suitable examples of the alkali which can be used in the second reaction step include an alkali metal hydroxide such as sodium hydroxide, potassium hydroxide, etc.; ammonia; an amine such as trimethylamine, triethylamine, etc.; or a nitrogen-containing basic compound such as pyradine, etc.; or a mixture thereof.

Since the novolak-type phenolic chelate resin of this invention can be cured by cross-linking reaction after molding into various desired forms utilizing the thermoplastic property of the resin, the fields of utilization of the resin are very broad.

In conducting the cross-linking reaction by immersing the chelate resin composition in an aqueous aldehyde solution, it is preferable to add an acid such as hydrochloric acid, oxalic acid, etc., as a catalyst and to heat the system at a temperature of from room temperature to 90°C, preferably from 40° to 90°C to increase the rate of the cross-linking reaction. The amount of the acid catalyst varies depending upon the type of acids and aldehydes employed.

Also, when the novolak-type chelate resin of this invention is pulverized and mixed with a cross-linking agent such as hexamine, para-formaldehyde and furfural, the mixture can be used as a molding material and can be cross-linked by heating after molding.

On the other hand, the resole-type chelate resin of this invention can be readily cured in a desired shape by dissolving it in water, molding or fabricating the solution into the desired shape, and heating the molded or fabricated product. Of course, by simultaneously conducting the granulation and cross-linking reaction in a solvent in which the chelate resin is insoluble, a granular chelate resin can be formed.

From the above description it can be seen that the phenolic chelate resins of this invention have excellent moldability or fabricating properties and this is an important advantage of the chelate resin of this invention.

The selectivity of the phenolic chelate resin of this invention to heavy metal ions depends upon the pH of the aqueous solution containing the heavy metal ions, the temperature of the solution, the kind and concentration of other ions present together with the heavy metal ions, etc. However, it has been confirmed that the selectivity thereof is generally the order of mercury: copper: lead: nickel: cadmium: zinc: cobalt: manganese: calcium: magnesium: barium: strontium: sodium, that is, with the selectivity to mercury being the highest.

For example, when three kinds of metal ions such as sodium ion, calcium ion, and cadmium ion are present in a solution is same concentrations, the phenolic chelate resin of this invention adsorbs selectively the cadmium ion only without changing the concentrations of the sodium ion and the calcium ion. The selectivity of the chelate resins are substantially the same whether the chelate resin is a novolak-type chelate resin or a resole-type chelate resin.

The adsorbability to heavy metal ions of the phenolic chelate resin for selectively adsorbing heavy metal ions prepared by the process of this invention differs depending on the manner of preparing the chelate resin but is generally almost 0.5 to 0.9 equivalent per one equivalent of the iminodiacetic acid group used.

If the chelate resin of this invention adsorbs a heavy metal ion until the adsorbability is saturated, the heavy metal ion adsorbed on the chelate resin can be desorbed from the chelate resin by treating the resin with a 1 to 5 N aqueous solution of a mineral acid such as hydrochloric acid or sulfuric acid, whereby the heavy metal ion is dissolved in the aqueous mineral acid solution. The thus treated chelate resin which does not contain heavy metal ions adsorbed can be reused as it is but it is preferable to treat the chelate resin with an alkaline aqueous solution such as an aqueous solution of sodium or potassium prior to reuse. The regeneration can be conducted a number of times, that is to say, the chelate resin can be used repeatedly a number of times by regeneration and in this case a reduction in neither adsprbability nor selectivity to the heavy metal ion is observed.

As described above, the phenolic chelate resin of this invention can be prepared in a simple manner, has excellent heavy metal adsorbability, can be used any number of times after regeneration, and thus has excellent features which have never been attained with conventional phenolic chelate resins.

Now, the invention will further be explained in detail by reference to the following examples. Unless otherwise indicated, all parts, percents, ratios and the like are by weight.

EXAMPLE 1

An aqueous solution of 37.6 parts of phenol, 26.6 parts of iminodiacetic acid, 16.2 parts of 37% formalin, and 80 parts of water was heated gradually from room temperature (about 20° to 30°C) to 70°C and after adding further to the solution 32.4 parts of 37% formalin while stirring the solution, the mixture was further stirred for 3 hours at a temperature of 90° to 95°C to continue the reaction. Then, after washing the reaction product, the reaction system was dehydrated under pressure to provide 73 parts of a light yellow resin. The reaction product was pulverized and the resin powder thus obtained was cured for 2 hours using a hot blast dryer at 120°C. The resin powder thus heat-cured was immersed in a 1 to 5 N aqueous sodium hydroxide solution at 25°C, whereby the resin was converted to the sodium form.

When the resin was added to an aqueous solution of cadmium in an amount of 250 ppm and the mixture was shaken, the amount of cadmium adsorbed on the resin was 1.7 milliequivalents per g of the resin.

EXAMPLE 2

A mixture of 37.6 parts of phenol, 26.6 parts of iminodiacetic acid, 16.2 parts of 37% formalin, and 80 parts of water was heated to 70°C for 3 hours to cause the reaction as in Example 1 and after adding to the reaction system 16.8 parts of sodium hydoxide and 32.4 parts of 37% formalin, the reaction was continued for 3 hours at 90° to 95°C. After dehydrating the reaction product at 90° to 100°C under pressure, the product was treated as in Example 1. The heavy metal ion adsorbability of the chelate resin thus obtained for cadmium ion was 1.1 milliequivalent per gram of the resin.

EXAMPLE 3

A mixture of 23.5 parts of phenol, 33.3 parts of iminodiacetic acid, 20.3 parts of 37% formalin, and 80 parts of water heated to 70°C for 3 hours and after adding to the mixture 23.5 parts of phenol and 12.2 parts of 37% formalin, the reaction was further continued for 3 hours at 90° to 95°C. After the reaction was completed, the reaction product was dehydrated at 100° to 110° C. The resin thus obtained was pulverized, immersed overnight in a 1:1 mixture (by volume) of an aqueous 35% hydrochloric acid solution and an aqueous 37% formalin solution, heated for 1 hour to 90°C, and then dried for 2 hours at 120°C. Thereafter, the resin was subjected to the alkali treatment as in Example 1. The adsorbability of the resin thus obtained for cadmium ion was 1.9 milliequivalent per gram of the resin.

EXAMPLE 4

A mixture of 47 parts of phenol, 67 parts of iminodiacetic acid, and 41 parts of 37% formalin was stirred for 3 hours at 70°C. After cooling the reaction product to 50°C, 51 parts of a 35% aqueous hydrochloric acid solution and 24 parts of 37% formalin were added to the reaction product and while maintaining the mixture at 50°C, the reaction was further continued for 8 hours. Furthermore, 23.5 parts of phenol was added to the mixture, the reaction temperature of the system was increased to 90° to 95° C, and then the condensation reaction was conducted for 2.5 hours at this temperature. When the pH of the reaction product was adjusted to 2 to 3 with 5 N aqueous sodium hydroxide solution, a viscous resin phase separated. The resin was recovered, washed with 80 parts of water, and then treated as in Example 1. The heavy metal ion adsorbability of the resin thus obtained was 2.2 milliequivalent of cadmium ion per gram of the resin.

EXAMPLE 5

A mixture of 28.5 parts of bisphenol A, 33.3 parts of iminodiacetic acid, 20.3 parts of 37% formalin, and 80 parts of water was reacted for 3 hours at 70°C. After adding further to the mixture 28.5 parts of bisphenol A and 12.2 parts of 37% formalin, the reaction was continued for 3 hours at 90° to 95°C. After the reaction was completed, the reaction product was dehydrated at 100° to 110°C. The resin thus obtained was pulverized, immersed overnight in a 1:1 mixture (by volume) of a 35% aqueous hydrochloric acid solution and 37% aqueous formalin solution, heated for 1 hour at 90°C, and then heated further for 2 hours at 120°C. The heavy metal ion adsorbability of the resin thus obtained for cadmium ion was 1.4 milliequivalent per gram of the resin.

While the invention has been described in detail and with reference to specific embodiments thereof, it will be apparent to one skilled in the art that various changes and modifications can be made therein without departing from the spirit and scope thereof.

What is claimed is:

1. A process of producing a phenolic chelate resin for adsorbing heavy metal ions selectively which comprises the steps of:
    a. heating an acidic mixture of a phenol, an aldehyde and iminodiacetic acid to 20° to 90°C under acidic conditions to introduce an iminoacidic acid group into the phenol; and then
    b. adding the phenol or the aldehyde or both such that the total amount of aldehyde is in excess to the iminodiacetic acid and then heating the reaction system at 90° to 110°C thereby polycondensing the entire amount of the phenol and said aldehyde.

2. The process as claimed in claim 1, wherein said phenol is phenol, an alkyl phenol, a polyhydric phenol or a compound containing a phenolic hydroxyl group.

3. The process as claimed in claim 2, wherein said phenol is phenol, o-ethylphenol, m-ethylphenol, p-ethylphenol, p-phenylphenol, bisphenol A, o-cresol, m-cresol, p-cresol, 2,3-xylenol, 2,5-xylenol, 3,4-xylenol, 3,5-xylenol, resorcinol, cathecol, or α-naphthol.

4. The process as claimed in claim 1, wherein said aldehyde is formaldehyde, para-formaldehyde, hexamethylenetetramine, acetaldehyde, propionaldehyde, benzaldehyde or furfural.

5. The process as claimed in claim 1, wherein said heating of step (a) is in the presence of a mineral acid, an organic acid, or an aromatic sulfonic acid.

6. The process as claimed in claim 1, wherein the reaction of step (b) is in the presence of a basic material or a mineral acid, an organic acid, or an aromatic sulfonic acid.

7. The process as claimed in claim 6, wherein said basic material is an alkali metal hydroxide, ammonia, or an amine.

8. The process as claimed in claim 7, wherein said basic material is sodium hydroxide, potassium hydroxide, ammonia, trimethylamine, triethylamine, or pyridine.

9. The process as claimed in claim 1, wherein said step (a) is conducted in a 5 to 90% aqueous suspension.

10. The process as claimed in claim 1, wherein said step (a) is conducted at 40° to 60°C.

11. The process as claimed in claim 1, wherein said step (a) is conducted for a period of 1 to 4 hours.

12. The process as claimed in claim 1, wherein said step (b) is conducted for a period of 1 to 6 hours.

13. The process as claimed in claim 1, wherein said step (b) is carried out in the presence of a solvent selected from the goup consisting of carbon tetrachloride, chloroform, trichlorethylene, chloral, dichloroethylene, dichloroethane, 1,2-dichloropropane, chlorobenzene, cyclohexane, cyclohexanol and toluene.

* * * * *